United States Patent [19]

Benedict

[11] Patent Number: 4,669,346
[45] Date of Patent: Jun. 2, 1987

[54] MACHINE WITH WORK POSITIONING CARRIAGE

[75] Inventor: Roger J. Benedict, Rockford, Ill.

[73] Assignee: Roper Whitney Co., division of Roper Industries, Inc., Rockford, Ill.

[21] Appl. No.: 836,637

[22] Filed: Mar. 5, 1986

[51] Int. Cl.4 .......................... B23Q 3/06; B26D 7/02
[52] U.S. Cl. ........................................ 83/412; 83/409; 83/465; 269/73; 269/138
[58] Field of Search ................ 83/409, 412, 414, 464, 83/465, 277, 452; 269/71, 73, 246, 138

[56] References Cited

U.S. PATENT DOCUMENTS

| | | | |
|---|---|---|---|
| 3,256,761 | 6/1966 | Huntley | 83/412 |
| 3,650,133 | 3/1972 | Bredow | 83/409 |
| 4,144,783 | 3/1979 | Yamazski et al. | 83/216 |
| 4,297,977 | 11/1981 | Kuroda | 83/412 |

FOREIGN PATENT DOCUMENTS 1039553 10/1953 France ................ 269/138

Primary Examiner—Frank T. Yost
Assistant Examiner—Hien H. Phan
Attorney, Agent, or Firm—Vernon J. Pillote

[57] ABSTRACT

A machine for operating on sheet stock workpieces having stock grippers mounted on a work positioning carriage for moving the sheet stock workpiece along first and second relatively transverse paths in the plane of the stock to position the workpiece at predetermined positions relative to the machine tools. Work grippers are mounted on the work positioning carriage for adjustment relative to the carriage when the work grippers are released and the work grippers are automatically clamped against movement relative to the carriage when the work grippers are actuated to grip the stock.

10 Claims, 7 Drawing Figures

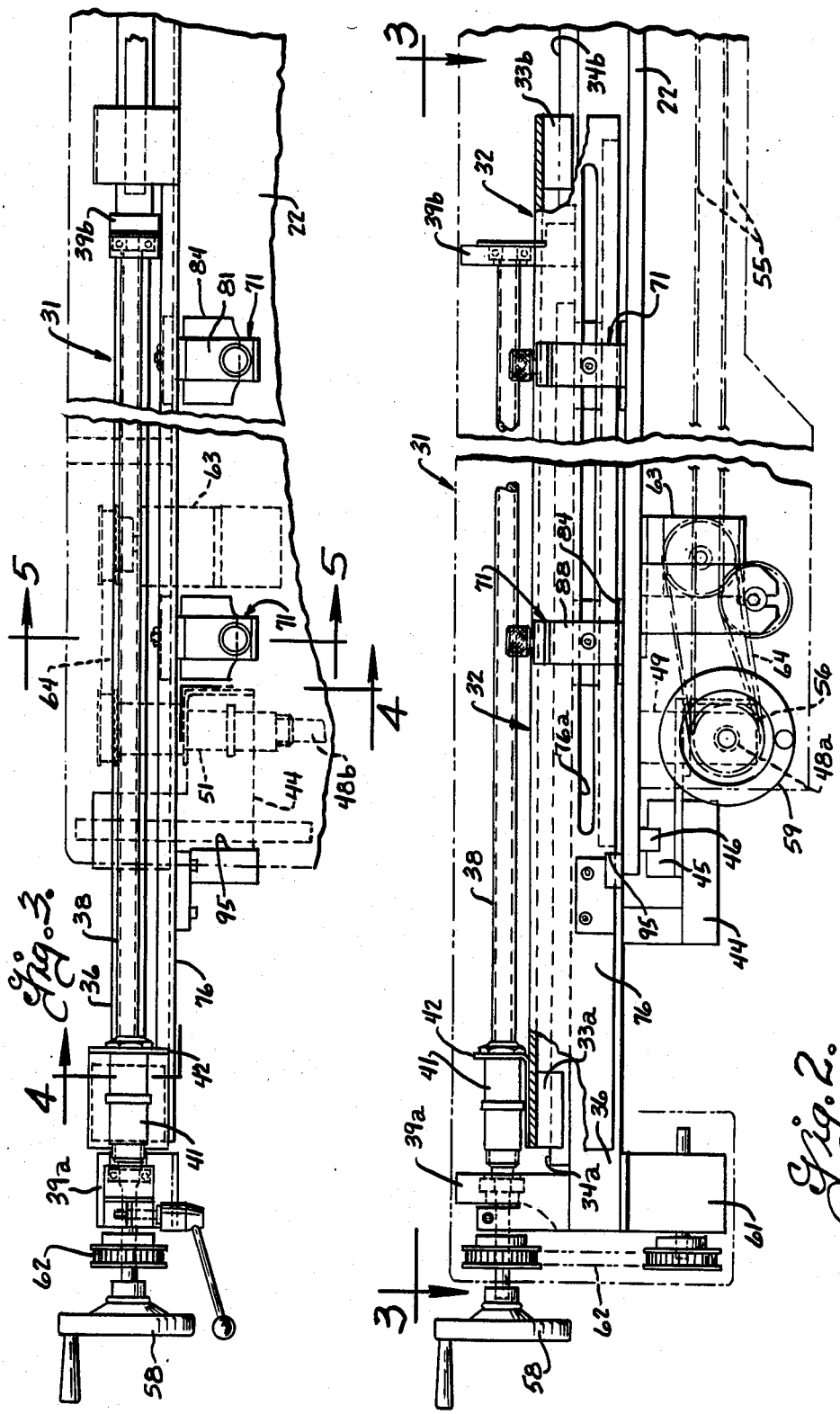

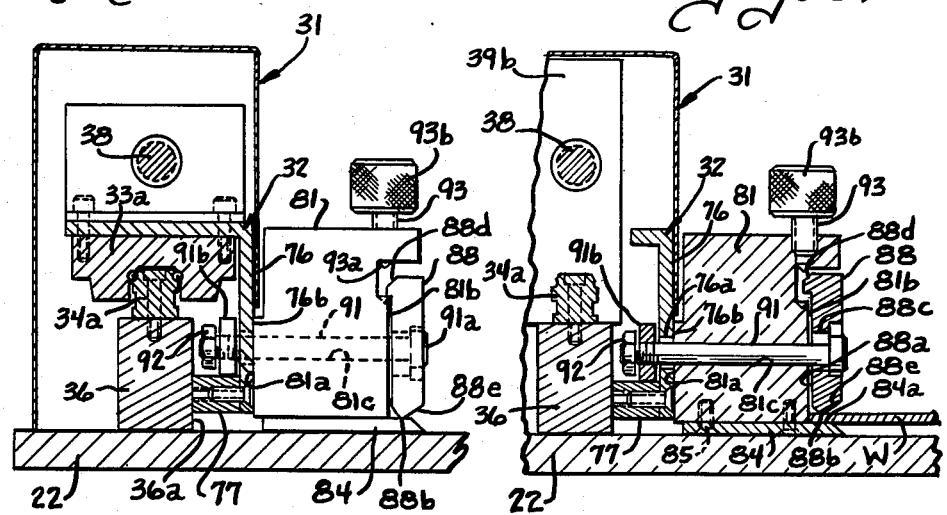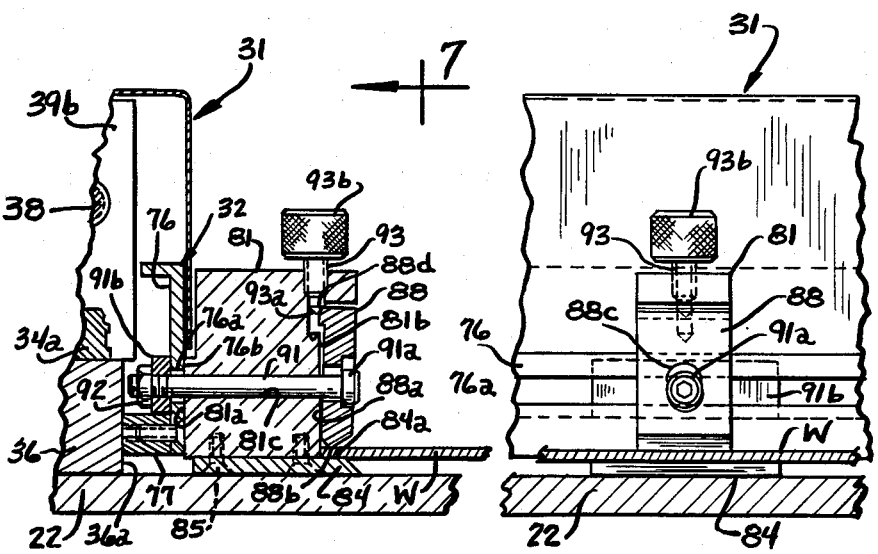

MACHINE WITH WORK POSITIONING CARRIAGE

BACKGROUND OF THE INVENTION

Machines such as punch presses have heretofore been made for operating on sheet stock workpieces and which have stock grippers mounted on a work positioning carriage for moving the sheet stock workpiece along first and second relatively transverse paths in the plane of the workpiece, to position the workpiece at predetermined positions relative to tools which perform operations on the workpiece. It is desirable to enable adjustment of the stock grippers relative to the work positioning carriage to not only accommodate different size sheet stock workpieces, but to also enable gripping of the stock at locations spaced from the areas on the workpiece where machine operations are to be performed.

SUMMARY OF THE INVENTION

It is a general object of the present invention to provide a machine for operating on a sheet stock workpiece having a work positioning carriage and a stock gripper mounted on the work positioning carriage, and in which the stock gripper is adjustable relative to the work positioning carriage when the stock gripper is released and the stock gripper is automatically clamped against movement relative to the carriage when the stock gripper is actuated to grip the workpiece.

Accordingly, the present invention provides a machine for operating on a sheet stock workpiece having a workpiece support, an elongated gripper support rail and carriage means supporting the rail for movement along first and second relatively transverse paths paralleling the plane of the workpiece. The gripper support rail includes a wall disposed in a plane transverse to the plane of the workpiece and a slot in the wall extending parallel to the plane of the workpiece. A stock gripper is adjustably mounted on the rail and includes a body having a rail engaging face disposed transverse to the plane of the workpiece and engageable with one side of the wall, a clamp guide face at the opposite side of the body disposed in a plane transverse of the plane of the workpiece, and a passage extending through the body between the rail guide face and the clamp guide face. A work engaging jaw is fixed on the body and extends from the clamp guide face adjacent the workpiece plane to engage the underside of a sheet stock workpiece, and a clamp jaw is disposed along the clamp guide face and has an opening therethrough and a work engaging nose at one end adjacent the work engaging jaw. A tie rod extends through the opening in the clamp jaw and through the passage in the body and through the slot in the rail. The tie rod has a rail engaging head at one end engageable with the side of the rail wall remote from the clamp body and a clamp jaw engaging head at the other end engageable with the clamp jaw of the side remote from the clamp body. A clamp jaw actuator is mounted on the body and engages the clamp jaw and is operable to apply a force to the clamp jaw in a direction to (a) move the clamp jaw toward the work engaging jaw to clamp a workpiece thereto and (b) move the clamp jaw in a direction away from the body to clamp the gripper body against movement along the rail.

BRIEF EXPLANATION OF THE DRAWINGS

FIG. 2 is a fragmentary front view of the punch press work table and work positioning carriage, with parts broken away and shown in section to illustrate details of construction;

FIG. 3 is a fragmentary horizontal sectional view taken on the plane 3—3 of FIG. 2;

FIG. 4 is a fragmentary transverse sectional view taken on the broken section line 4—4 of FIG. 3 and illustrating the workpiece carriage and gripper means on a larger scale than FIG. 3;

FIGS. 5 and 6 are fragmentary transverse sectional views taken on the plane 5—5 of FIG. 3 and illustrating the parts on a larger scale than FIG. 3 and in different moved positions; and FIG. 7 is a fragmentary sectional view taken on the plane 7—7 of FIG. 6.

DETAILED DESCRIPTION OF A PREFERRED EMBODIMENT

Figure 1:
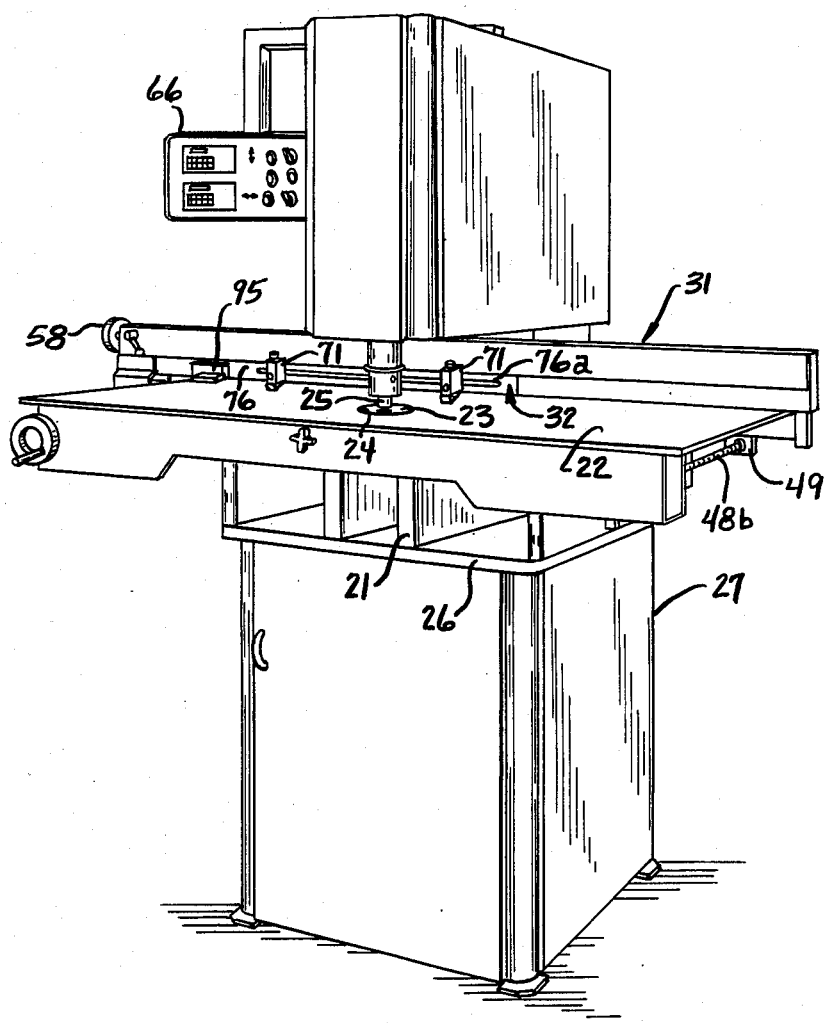
FIG. 1 is a perspective view of a punch press embodying the present invention.

The present invention relates generally to machines for performing operations such as punching, cutting, assembly of parts, and the like at preselected locations on a sheet stock workpiece and is herein specifically illustrated in FIG. 1 embodied in a punch press. In general, the machine such as a punch press includes a frame 21, conveniently of C-shaped configuration, and having a horizontal work support table 22 extending through the throat or work opening of the C-shaped frame to underlie and support a sheet stock workpiece in a generally horizontal plane. A stationary tool or die means 23 is mounted on the frame and extends upwardly through an opening 24 in the work table and a a movable tool such as a punch 25 is mounted on the frame above the work table for movement toward and away from the stationary tool. As shown in FIG. 1, the frame 21 and work table 22 are conveniently attached to a support plate 26 mounted on a support stand 27.

Work positioning carriage means 31 are provided for gripping a sheet stock workpiece adjacent one edge and for moving the sheet stock workpiece along first and second relatively transverse paths in the plane of the workpiece to position the workpiece at selected locations relative to the stationary tool means of the machine. The workpiece positioning carriage means includes an elongated gripper support rail 32 that is mounted as by carriers 33a and 33b (FIG. 3) on linear ways 34a, 34b fixed to a carrier bar 36. The carrier bar 36 extends across the top of the work table 22 parallel to one axis of the work table, hereinafter sometimes referred to as the X-axis, and the carriers support the rail for movement along a first path lengthwise of the rail and parallel to the plane of the work table. A lead screw 38 is supported as by brackets 39a and 39b on the carrier bar 36 to extend lengthwise thereof and a lead screw follower 41 is mounted on the lead screw 38 and connected as by a bracket 42 to the rail 32 to move the rail along the carrier bar 36 in a direction and distance corresponding to the direction and angular rotation of the screw.

The carrier bar 36 extends parallel to the X-axis across the top of the work table 22 and is guided for movement in a transverse direction along a Y-axis across the work table by brackets 44 fixed to the carrier bar adjacent opposite ends and which have followers 45

(FIG. 2) slidably engaging linear ways 46 at the underside of the work table. A means such as a pair of lead screws 48a (FIGS. 2 and 3) and 48b (FIG. 1) are mounted as by brackets 49 at the underside of the work table for rotation about axes parallel to the linear ways 46, and screw followers 51 (FIG. 3) are mounted on the lead screws and connected to the brackets 44 to move the carrier bar 36 crosswise over the top of the work table in a direction and distance corresponding to the direction and angular rotation of the lead screws. As shown in FIG. 2, lead screws 48a and 48b are drivingly interconnected for rotation in unison as by a chain 55 entrained over sprockets 56 on the screw shafts 48a and 48b. The screw shafts can be operated manually or power operated by computer numerical control apparatus to effect positioning of the workpiece along respective X and Y axes. In the embodiment illustrated, lead screw 38 is arranged to be manually operated by a crank wheel 58 and lead screw 48a arranged to be manually operated by a crank wheel 59. The machine may be manually operated under the control of a foot or hand switch (not shown). Alternatively, the lead screws 38 and 39 can be provided with power drives and numerical control apparatus of conventional construction provided to effect automatic positioning of the workpiece at preselected locations relative to the machine tools and operation of the machine in timed relation with the carriage positioning means. As shown in FIGS. 2 and 3 a shaft encoder 61 is connected as through a toothed belt drive 62 to the lead screw 38 and a shaft encoder 63 is connected as through a toothed belt drive 64 to the lead screw 48a. The shaft encoders are of the type that produce a number of electrical output pulses per revolution of the respective shaft and which may be utilized to either provide a visual display of the position of the gripper support rail along the X and Y axes in a display shown at 66 in FIG. 1, or, alternatively, utilized in a computer numerical control apparatus to effect automatic control of motor drives for the shafts.

Stock grippers 71 are mounted on the rail 32 for gripping a sheet stock workpiece adjacent one edge thereof and the stock grippers are advantageously mounted for adjustment relative to the rail 32 to accommodate workpieces of different size and to also enable gripping of the sheet stock at locations spaced from the locations where it is desired to have the machine perform an operation on the sheet stock. In accordance with the present invention, the stock grippers 71 are constructed and arranged so that actuation of the stock grippers to grip the workpiece adjacent one edge also operates to clamp the stock grippers against movement lengthwise of the rail.

As best shown in FIGS. 2-6 the gripper support rail 32 includes a lengthwise extending wall 76 disposed in an upright plane transverse through the work table 22 and the wall 76 has a horizontal slot 76a extending lengthwise thereof and parallel to the worktable 22. The carriers 33a, 33b are attached to and support the rail 76 at locations above the slot 76a and a guide 77 is attached to the wall 76 at a location below the slot 76a and arranged to guidably engage the forward side face 36a of the carrier bar 36 to maintain the wall 76 in an upright plane. The grippers 71 each include a gripper body 81 having a rear rail engaging face 81a disposed in an upright plane transverse to the work table 22 and adapted to slidably engage a forward face portion 76b on the wall 76. Each body 81 also has a generally upright clamp guide face 81b disposed in a plane transverse to the work table 22, at the side of the body opposite the rail guide face 81a, and a passage or guide bore 81c extends through the body between the clamp guide face 81b and the rail guide face 81a. A work engaging jaw 84 is fixed as by fasteners 85 to the underside of the body 81 and extends forwardly from the clamp guide face 81b to engage the underside of a workpiece adjacent one edge thereof. The forward edge of the jaw 84 is advantageously inclined downwardly and forwardly to the plane of the work table 22 as shown in FIGS. 4–6 to facilitate guiding of an edge portion of the sheet stock workpiece onto the work engaging jaw.

A clamp jaw 88 has one side 88a disposed alongside the clamp guide face 81b and a work engaging nose 88b at its lower end adjacent the work engaging jaw 84. The clamp jaw has an opening 88c intermediate its upper lower ends and a tie rod, herein shown in the form of a bolt 91, extends through the opening in the clamp jaw, and through the passage 81c in the body and through the slot 76a. The tie rod 91 has a head 91a at one end arranged to engage a surface at the outer side of the clamp jaw and a rail engaging head 91b at the other end arranged to engage the face 76c of the wall 76 remote from the body 81. The rail engaging head 91b is advantageously threadedly mounted on the end of the tie rod 91 to enable adjustment of the normal clearance between the parts as described hereafter, and a jam nut 92 is threaded on the end of the tie rod for locking the head 91b in adjusted position. Head 91b is advantageously elongated in a direction paralleling the slot and arranged to engage the guide 77 to constrain the head 91b against turning when the tie rod 91 is rotated. As shown in FIG. 4, the head 91a has a means such as a wrench receiving socket to enable turning of the tie rod to adjust the normal clearance between the parts. The opening 88c in the clamp jaw is vertically elongated to enable limited vertical movement of the clamp jaw relative to the body and the tie rod is adjusted so as to normally allow the body and rail engaging head 91b to slide freely along the rail and to also allow the clamp jaw 88 to slide vertically relative to the body.

A clamp jaw actuator 93 is mounted on the body and arranged to engage the clamp jaw to apply a force to the clamp jaw in a direction that will move the clamp jaw toward the work engaging jaw to clamp the workpiece to the work engaging jaw and also move the clamp jaw in a direction away from the clamp body to clamp the gripper body to the rail 32. As best shown in FIGS. 4-6, the clamp jaw 88 has a cam face 88d at a location above the opening 88c, which cam face is inclined downwardly and rearwardly toward the clamp body 81. The actuator 93 is threadedly mounted in a bore in the body for vertical adjustment relative thereto and the actuator has a beveled nose 93a at its lower end arranged to engage the cam face 88d when the actuator is moved downwardly. The actuator is conveniently operated by a thumb nut 93b and is movable from a raised inoperative or release position as shown in FIGS. 4 and 5, to a lower clamp jaw actuating position as shown in FIG. 6. When the actuator 93 is in its release position, the body 81 and rail engaging shoe 91b can slide along the rail to enable positioning of the stock gripper 71 therealong and the clamp jaw can slide upwardly relative to the body to allow insertion of a workpiece between the fixed jaw 84 and the lower end of the clamp jaw. The work engaging end of the clamp jaw is advantageously formed with a downwardly and rearwardly inclined bevel 88e to cam the jaw upwardly when the workpiece W is inserted between the fixed jaw 84 and the movable jaw 88. The clamp jaw guide face 81b of the body forms a stop engageable with the edge of the sheet stock workpiece W to locate the same along the Y axis. A gauge stock 95 is mounted on the rail 32 at a location to engage a transversely extending edge of the sheet stock workpiece, to position the same relative to the rail in a direction along the X axis. When the actuator 93 is moved downwardly, the nose 93a engages the cam face 88d on the upper end of the clamp jaw and exerts a force on the clamp jaw having one component in a direction to press the clamp jaw downwardly into clamping engagement with the workpiece and a second component which pushes the upper end of the clamp jaw laterally away from the body as shown in FIG. 6. As the upper end of the clamp jaw is pressed laterally away from the body 81, the lower end of the clamp jaw fulcrums against the clamp jaw guide face 81b so that the body 81 is pressed rearwardly toward the wall 76 of the rail while the tie rod 91 draws the rail engaging head 91b forwardly against the other side of the wall 76 to clamp the body to the wall 76 of the rail. Thus, operation of the clamp jaw actuator 93 clamps the workpiece to the stock gripper and also clamps the stock gripper in the adjusted position along the rail.

At least one and preferably at least two stock grippers 71 are provided. As will be seen, the stock grippers are not only adjustable relative to the rail but are also adjustable relative to each other so that the stock grippers can accommodate sheet stock workpieces of different size and also can be located to engage the sheet stock at locations remote from the locations where a machine operation is to be formed. Further, when two or more clamps are used, the clamps can be released one at a time and moved to a different position along the rail to grip the stock at a different location, while the other clamp or clamps maintain the sheet stock in a preset position relative to the gripper support rail.

The embodiments of the invention in which an exclusive property or privilege is claimed are defined as follows:

1. A machine for operating on a sheet stock workpiece comprising, a frame, workpiece support means for supporting a sheet stock workpiece in a workpiece plane, stationary tool means mounted on the frame at one side of the workpiece plane, movable tool means mounted on the frame at the other side of the workpiece plane for movement toward and away from the stationary tool means, an elongated gripper support rail, carriage means mounting the gripper support rail for movement along a first path lengthwise of the rail and parallel to the workpiece plane and along a second path transverse to the rail and parallel to the workpiece plane, the rail including wall means defining first and second face portions extending lengthwise of the rail at opposite sides of the wall means and disposed in planes transverse to the workpiece plane, the wall means having a lengthwise extending slot therethrough and opening at said first and second face portions, stock gripper means mounted on the rail for adjustment therealong, the stock gripper means including a body having a rail guide face disposed transverse to the workpiece plane at one side of the body and adapted to engage said first face portion, the body having a clamp guide face disposed transverse to the workpiece plane at the side of the body opposite said rail guide face, the body having a passage extending therethrough between said rail guide face and said clamp guide face, a work engaging jaw on the body extending from the clamp guide face adjacent the workpiece plane and adapted to engage the underside of a sheet stock workpiece adjacent an edge thereof, a clamp jaw disposed alongside the clamp guide face and having an opening therethrough adapted to register with the passage in the body and a work engaging nose at one end adjacent said work engaging jaw, tie rod means extending through the opening in the clamp jaw and through the passage in the body and through the slot in the rail, the tie rod means having rail engaging head means at one end engageable with the second face portion on the rail and clamp jaw engaging head means at the other end engageable with the clamp jaw at the side thereof remote from the body, and clamp jaw actuator means mounted on the body and engageable with the clamp jaw, said clamp jaw actuator means being operable to apply a force to the clamp jaw in a direction to (a) move the clamp jaw toward the work engaging jaw to clamp a workpiece thereto and (b) move the clamp jaw in a direction away from the body to clamp the body against movement along the rail.

2. A machine according to claim 1 wherein the clamp jaw has a cam face thereon at a location spaced from the work engaging nose and said clamp jaw actuator means includes an actuator member mounted on the body for adjustment relative thereto and having a nose portion engageable with the cam face.

3. A machine according to claim 1 wherein the clamp jaw has a cam face thereon at a location spaced from the work engaging nose, said clamp jaw actuator means including a screw threadedly mounted in the body for adjustment relative thereto and having a nose portion at one end engageable with the cam face.

4. A machine according to claim 1 including means for adjusting the spacing between said rail engaging head means and said clamp jaw engaging head means to provide an initial sliding clearance between the rail engaging head means and the second face portion on the rail.

5. A machine according to claim 1 wherein said clamp guide face on the body is adapted to engage an edge of a sheet stock workpiece to locate the same, said work engaging nose of said clamp jaw having an end face portion that diverges relative to the work engaging jaw to cam the clamp jaw in a direction away from the work engaging jaw when the edge of a workpiece is introduced therebetween.

6. A machine according to claim 1 wherein at least two of said stock gripper means are provided on the rail.

7. A machine for operating on a sheet stock workpiece comprising, a frame, a horizontal workpiece support, stationary tool means mounted on the frame at one side of the workpiece support, movable tool means mounted on the frame at the other side of the workpiece support, an elongated gripper support rail, carriage means supporting the gripper support rail for movement along a first horizontal path parallel to the rail and along a second horizontal path transverse to the rail, the rail having lengthwise extending first and second, face portions disposed in parallel generally upright planes and a lengthwise extending generally horizontal slot opening at the first and second face portions, at least one stock gripper means mounted on the rail for adjustment therealong, the stock gripper means including a gripper body having a generally upright rail guide face at a first side adapted to engage the first face portion of the rail and a generally upright clamp guide face at a second side generally parallel to said first side and a generally horizontal passage extending between said rail guide face and said clamp guide face, a lower work engaging jaw extending from a lower end of the clamp guide face of the gripper body and adapted to engage the underside of a sheet stock workpiece adjacent an edge thereof, a generally upright clamp jaw disposed alongside the clamp guide face of the gripper body and having an opening therethrough intermediate its upper and lower ends adapted to register with said passage and a work engaging nose at its lower end adjacent said work engaging jaw, tie rod means extending through the opening in the clamp jaw and through the passage in the body and through the slot in the rail, the tie rod means having a rail engaging head means at one end engageable with the second face portion on the rail and a clamp jaw engaging head means at its other end adapted to engage the clamp jaw at the side remote from the body, and clamp jaw actuator means mounted on the body and engageable with the clamp jaw, said clamp jaw actuator means being operable to apply a force to the clamp jaw in a direction to (a) move the clamp jaw downwardly relative to the body to clamp a workpiece to the lower work engaging jaw and (b) move the upper portion of the clamp jaw away from the body to clamp the body against movement along the rail.

8. A machine according to claim 7 wherein the clamp jaw has a cam face thereon at a location above the opening therein and inclined downwardly in a direction toward the body, said clamp jaw actuator means including a member mounted on the body for vertical adjustment relative thereto and having a nose portion engageable with the cam face.

9. A machine according to claim 7 wherein the clamp jaw has a cam face thereon at a location above the opening therein and inclined downwardly toward the body, said clamp jaw actuator means including a screw threadedly mounted in the body for vertical adjustment relative thereto and having a nose portion at its lower end engageable with the cam face.

10. A machine according to claim 7 wherein at least two of said stock gripper means are provided on the rail.

* * * * *